(12) United States Patent
Uchino et al.

(10) Patent No.: US 11,184,818 B2
(45) Date of Patent: Nov. 23, 2021

(54) MOBILE STATION, RECONNECTION REQUEST METHOD, BASE STATION, AND RECONNECTION REQUEST PROCESSING METHOD

(71) Applicant: NTT DOCOMO, INC., Tokyo (JP)

(72) Inventors: Toom Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 124 days.

(21) Appl. No.: 15/032,716

(22) PCT Filed: Jan. 14, 2015

(86) PCT No.: PCT/JP2015/050743
§ 371 (c)(1),
(2) Date: Apr. 28, 2016

(87) PCT Pub. No.: WO2015/115176
PCT Pub. Date: Aug. 6, 2015

(65) Prior Publication Data
US 2016/0255552 A1 Sep. 1, 2016

(30) Foreign Application Priority Data

Jan. 30, 2014 (JP) .............................. JP2014-016190

(51) Int. Cl.
*H04W 36/04* (2009.01)
*H04W 36/36* (2009.01)
(Continued)

(52) U.S. Cl.
CPC ............ *H04W 36/04* (2013.01); *H04B 7/024* (2013.01); *H04W 36/36* (2013.01); *H04W 76/19* (2018.02);
(Continued)

(58) Field of Classification Search
CPC .. H04L 5/0098; H04W 76/028; H04W 16/06; H04W 36/04; H04W 36/36; H04W 76/025; H04W 76/027; H04W 76/04; H04B 7/024
See application file for complete search history.

(56) References Cited

U.S. PATENT DOCUMENTS 8,731,559 B2 * 5/2014 Shi ..................... H04W 36/0055
370/331
8,792,891 B2 * 7/2014 Han ..................... H04W 76/19
455/436
(Continued)

FOREIGN PATENT DOCUMENTS

| JP | 2007-088689 A | 4/2007 |
| JP | 2013-239859 A | 11/2013 |
| WO | 2013113159 A1 | 8/2013 |

OTHER PUBLICATIONS

Office Action issued in the counterpart Japanese Patent Application No. 2014-016190, dated Feb. 14, 2017 (5 pages).
(Continued)

*Primary Examiner* — Ahmed Elallam
(74) *Attorney, Agent, or Firm* — Osha Bergman Watanabe & Burton LLP

(57) ABSTRACT

A mobile station for performing communication using component carriers belonging to different base stations includes a reconnection determination unit configured to determine a trigger to initiate a reconnection procedure; a reconnection request unit configured to generate a reconnection request using at least one of information about a primary cell and information about a secondary cell; and a transmission unit configured to transmit the reconnection request.

6 Claims, 11 Drawing Sheets

(51) Int. Cl.
   *H04W 76/20* (2018.01)
   *H04B 7/024* (2017.01)
   *H04W 76/19* (2018.01)
   *H04W 16/06* (2009.01)
   *H04W 76/15* (2018.01)
   *H04L 5/00* (2006.01)
   *H04W 36/00* (2009.01)

(52) U.S. Cl.
   CPC .......... *H04W 76/20* (2018.02); *H04L 5/0098* (2013.01); *H04W 16/06* (2013.01); *H04W 36/0079* (2018.08); *H04W 76/15* (2018.02)

(56) References Cited

U.S. PATENT DOCUMENTS

| | | | |
|---|---|---|---|
| 9,215,628 B2* | 12/2015 | Xu | H04W 36/0033 |
| 9,247,465 B2* | 1/2016 | Wang | H04W 36/0038 |
| 9,451,609 B2* | 9/2016 | Fukuta | H04W 74/002 |
| 9,480,098 B2* | 10/2016 | Chen | H04W 76/20 |
| 9,510,387 B2* | 11/2016 | Vesterinen | H04W 76/19 |
| 9,930,581 B2* | 3/2018 | Bai | H04W 36/305 |
| 10,136,365 B2* | 11/2018 | Xu | H04W 36/0055 |
| 10,484,916 B2* | 11/2019 | da Silva | H04W 76/19 |
| 10,555,361 B2* | 2/2020 | Futaki | H04W 76/19 |
| 10,791,486 B1* | 9/2020 | Xu | H04W 36/0033 |
| 2011/0242965 A1* | 10/2011 | Strzyz | H04W 36/06 370/216 |
| 2011/0269426 A1* | 11/2011 | Hultin | H04W 12/10 455/411 |
| 2012/0003977 A1* | 1/2012 | Iwamura | H04W 36/0033 455/436 |
| 2012/0157156 A1* | 6/2012 | Han | H04W 76/19 455/525 |
| 2012/0202557 A1* | 8/2012 | Olofsson | H04W 24/08 455/525 |
| 2012/0276897 A1* | 11/2012 | Kwon | H04B 1/1027 455/423 |
| 2012/0281527 A1* | 11/2012 | Sebire | H04W 76/028 370/228 |
| 2013/0237222 A1* | 9/2013 | Seki | H04W 48/16 455/434 |
| 2014/0051447 A1* | 2/2014 | Li | H04W 76/028 455/437 |
| 2014/0179325 A1* | 6/2014 | Xu | H04W 36/0033 455/437 |
| 2014/0220974 A1* | 8/2014 | Hsu | H04W 36/0088 455/436 |
| 2014/0321430 A1* | 10/2014 | Bakker | H04W 36/0072 370/331 |
| 2014/0334371 A1* | 11/2014 | Kim | H04W 52/0206 370/311 |
| 2014/0335872 A1* | 11/2014 | Yamada | H04W 24/04 455/450 |
| 2015/0063091 A1* | 3/2015 | Vesterinen | H04W 8/02 370/216 |
| 2015/0201354 A1* | 7/2015 | Zhang | H04W 76/028 370/221 |
| 2015/0223106 A1* | 8/2015 | Phan | H04L 29/14 370/225 |
| 2015/0237540 A1* | 8/2015 | Lieshout | H04W 36/0055 455/436 |
| 2015/0245406 A1* | 8/2015 | Johansson | H04W 76/027 370/228 |
| 2015/0271867 A1* | 9/2015 | Lee | H04W 76/02 370/329 |
| 2015/0319801 A1* | 11/2015 | Lee | H04W 56/00 370/329 |
| 2015/0327094 A1* | 11/2015 | Lee | H04W 76/27 370/252 |
| 2015/0373772 A1* | 12/2015 | Watanabe | H04W 76/19 455/436 |
| 2016/0057802 A1* | 2/2016 | Lee | H04W 76/19 370/329 |
| 2016/0157143 A1* | 6/2016 | Olofsson | H04W 36/0083 455/436 |
| 2016/0183321 A1* | 6/2016 | Wen | H04W 76/34 370/329 |
| 2016/0353511 A1* | 12/2016 | Gunnarsson | H04W 76/028 |
| 2017/0237531 A1* | 8/2017 | Futaki | H04L 5/001 370/338 |
| 2017/0374705 A1* | 12/2017 | Mitsui | H04W 76/027 |
| 2018/0288778 A1* | 10/2018 | Heo | H04W 8/06 |
| 2019/0028936 A1* | 1/2019 | Xu | H04W 36/0055 |

OTHER PUBLICATIONS

Office Action issued May 16, 2017, in corresponding Japanese Patent Application No. 2014-016190 (5 pages).
China Mobile, "Discussion on RLF related issues," R2-134164, 3GPP TSG-RAN WG2 Meeting #84, San Francisco, USA, Nov. 11-15, 2013 (4 pages).
Nokia Siemens Networks et al., "CR to 36.331 to include reestablishmentCellId in RLF Report," R2-112858, 3GPP TSG-RAN2 Meeting #74, Barcelona, Spain, May 9-13, 2011 (4 pages).
International Search Report issued in corresponding application No. PCT/JP2015/050743 dated Apr. 7, 2015 (4 pages).
Written Opinion issued in corresponding application No. PCT/JP2015/050743 dated Apr. 7, 2015 (4 pages).
3GPP TS 36.331 V12.0.0; "3rd Generation Partnership Project; Technical Specification Group Radio Access Network; Evolved Universal Terrestrial Radio Access (E-UTRA); Radio Resource Control (RRC); Protocol specification (Release 12)"; Dec. 2013 (349 pages).
Alcatel-Lucent et al.; "Some considerations on RLM and RLF supporting dual connectivity"; 3GPP TSG RAN WG2 Meeting #83, R2-132766, Barcelona, Spain, Aug. 19-23, 2013 (2 pages).
ZTE; "Comparison of one serving cell and multiple serving cells"; 3GPP TSG RAN WG2 #67bis, R2-095668, Miyazaki, Japan, Oct. 12-26, 2009 (6 pages).
BlackBerry UK Limited; "Considerations of Small Cell RRC Message Transmission"; 3GPP TSG RAN WG2 Meeting #83, R2-132441, Barcelona, Spain, Aug. 19-23, 2013 (7 pages).
Ericsson, ST-Ericsson; "UE identification at RRC connection re-establishment"; 3GPP TSG-RAN WG2 #70, Tdoc R2-103084, Montreal, Canada, May 10-14, 2010 (2 pages).
Office Action issued in the counterpart Chinese Patent Application No. 201580002832.X, dated Dec. 24, 2018 (34 pages).
Office Action issued in the counterpart Chinese Patent Application No. 201580002832.X, dated Aug. 20, 2019 (20 pages).
Office Action issued in the counterpart Chinese Patent Application No. 201580002832.X, dated Mar. 3, 2020 (12 pages).
Office Action issued in the counterpart Chinese Patent Application No. 201580002832.X, dated Dec. 8, 2020 (21 pages).

* cited by examiner

MOBILE STATION, RECONNECTION REQUEST METHOD, BASE STATION, AND RECONNECTION REQUEST PROCESSING METHOD

TECHNICAL FIELD

The present invention relates to a mobile station, a reconnection request method, a base station, and a reconnection request processing method.

BACKGROUND ART

In an LTE (Long Term Evolution) system, when a mobile station (UE: User Equipment) detects an abnormal condition on a radio link between a base station (eNB: evolved Node B) and the mobile station, the mobile station initiates a reconnection procedure with the base station (see 3GPP TS 36.331, V12.0.0, 2013-12).

Triggers to initiate the reconnection procedure include detection of a radio link failure (for example, degradation in quality of a downlink, excess of a maximum retransmission count of RA (Random Access) preamble transmissions, excess of a maximum retransmission count in an RLC (Radio Link Control) layer, or the like), detection of a handover failure, detection of an integrity failure, detection of a reconfiguration failure, and so on.

FIG. 1 shows a reconnection procedure in an LTE system. When a mobile station (UE) detects a failure as described above, the mobile station transmits an RA preamble to a base station (eNB). Specifically, the mobile station randomly selects a preamble and transmits the preamble on a random access channel. When the base station detects the preamble, the base station transmits an RA response. The RA response includes transmission allocation information. The mobile station transmits a reconnection request, that is, an RRC connection re-establishment request according to the transmission allocation information specified in the RA response. The RRC connection re-establishment request includes a PCI (Physical Cell Identifier) as an identifier of a previously-connected cell and a C-RNTI (Cell-Radio Network Temporary Identifier) as an identifier of the mobile station. The base station individually sets up a configuration for the mobile station and transmits an RRC connection re-establishment to the mobile station. Then, an RRC connection re-establishment complete, an RRC connection reconfiguration, and an RRC connection reconfiguration complete are transmitted and received between the mobile station and the base station and a reconnection is completed between the mobile station and the base station.

DISCLOSURE OF INVENTION

Problem(s) to be Solved by the Invention

In an LTE-Advanced system, CA (Carrier Aggregation) is under discussion to achieve higher throughput using a plurality of CCs (Component Carriers). According to CA, not only a plurality of CCs belonging to the same base station but also CCs belonging to different base stations can be used. Communication using CCs belonging to different base stations is referred to as "Dual Connectivity". Dual Connectivity is useful when all CCs cannot be accommodated in a single base station or when higher throughput needs to be achieved in an area where an ideal backhaul cannot be adequately installed.

In Dual Connectivity, it is expected that a mobile station will maintain C-RNTIs corresponding to the number of base stations in connection. In other words, it is expected that a C-RNTI used to communicate with a base station of a PCell (Primary Cell) will be different from a C-RNTI used to communicate with a base station of an SCell (Secondary Cell).

On the other hand, in the reconnection procedure as described with reference to FIG. 1, when the mobile station transmits the RRC connection re-establishment request, a PCI and a C-RNTI need to be also transmitted. However, in Dual Connectivity, which cell should be used for a PCI and a C-RNTI is not defined. Thus, a reconnection attempt may fail because the base station cannot accept an RRC Connection re-establishment request transmitted from the mobile station.

It is a general object of the present invention to implement a reconnection to a base station when a mobile station performs communication using CCs belonging to different base stations.

Means for Solving the Problem(s)

In one aspect of the present invention, there is provided a mobile station for performing communication using component carriers belonging to different base stations, including:

a reconnection determination unit configured to determine a trigger to initiate a reconnection procedure;

a reconnection request unit configured to generate a reconnection request using at least one of information about a primary cell and information about a secondary cell; and a transmission unit configured to transmit the reconnection request.

In another aspect of the present invention, there is provided a reconnection request method in a mobile station for performing communication using component carriers belonging to different base stations, including the steps of:

determining a trigger to initiate a reconnection procedure;

generating a reconnection request using at least one of information about a primary cell and information about a secondary cell; and transmitting the reconnection request.

In another aspect of the present invention, there is provided a base station in a radio system where a mobile station performs communication using component carriers belonging to different base stations, including:

a reception unit configured to receive a reconnection request from the mobile station; and a reconnection request forward unit configured to forward the received reconnection request to a base station of a primary cell.

In another aspect of the present invention, there is provided a reconnection request processing method in a base station in a radio system where a mobile station performs communication using component carriers belonging to different base stations, including the steps of:

receiving a reconnection request from the mobile station; and forwarding the received reconnection request to a base station of a primary cell.

In another aspect of the present invention, there is provided a mobile station for performing communication using component carriers belonging to different base stations, including:

a reconnection-target cell management unit configured to manage information about a reconnection-target cell provided from a base station;

a reconnection determination unit configured to determine a trigger to initiate a reconnection procedure;

a reconnection request unit configured to generate a reconnection request using the information about the reconnection-target cell managed by the reconnection target-cell management unit; and a transmission unit configured to transmit the reconnection request.

In another aspect of the present invention, there is provided a reconnection request method in a mobile station for performing communication using component carriers belonging to different base stations, including the steps of:

managing information about a reconnection-target cell provided from a base station;

determining a trigger to initiate a reconnection procedure;

generating a reconnection request using the managed information about the reconnection-target cell; and transmitting the reconnection request.

In another aspect of the present invention, there is provided a base station in a radio system where a mobile station performs communication using component carriers belonging to different base stations, including:

a reconnection-target cell designation unit configured to designate a reconnection-target cell for the mobile station;

a reception unit configured to receive a reconnection request from the mobile station; and a reconnection request forward unit configured to forward the received reconnection request to a base station corresponding to the reconnection-target cell designated by the reconnection-target cell designation unit, when the received reconnection request is not destined for the own base station.

In another aspect of the present invention, there is provided a reconnection request processing method in a base station in a radio system where a mobile station performs communication using component carriers belonging to different base stations, including the steps of:

designating a reconnection-target cell for the mobile station;

receiving a reconnection request from the mobile station; and forwarding the received reconnection request to a base station corresponding to the designated reconnection-target cell, when the received reconnection request is not destined for the own base station.

Advantageous Effect of the Invention

According to the present invention, it is possible to implement a reconnection to a base station when a mobile station performs communication using CCs belonging to different base stations.

DETAILED DESCRIPTION OF THE PREFERRED EMBODIMENTS

Embodiments of the present invention are described below with reference to the accompanying drawings.

Embodiments of the present invention are described focusing on CA (carrier aggregation) where a mobile station performs communication using CCs (Component Carriers) belonging to different base stations. This type of connectivity relating to CA is referred to as "Dual Connectivity".

Figure 2:
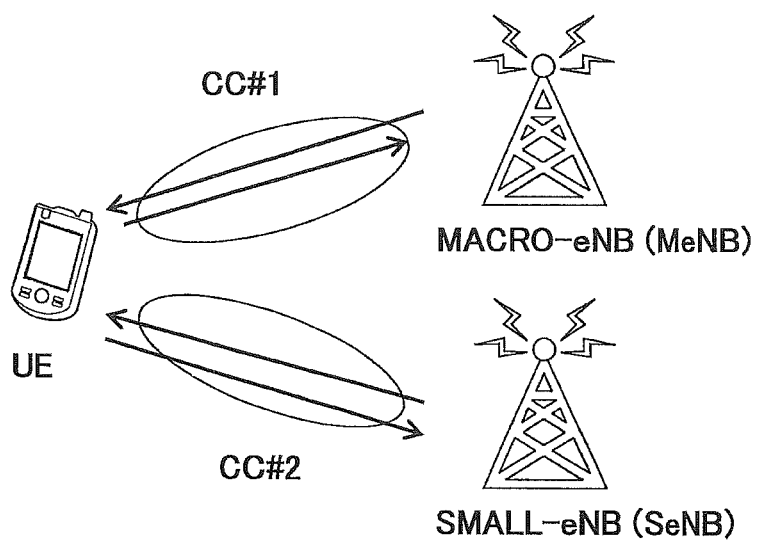
FIG. 2 shows a conceptual diagram of a radio communication system to which an embodiment of the present invention can be applied.

FIG. 2 shows a conceptual diagram of a radio communication system to which an embodiment of the present invention can be applied. In FIG. 2, a mobile station (UE) implements Dual Connectivity by performing communication using CCs (CC#1 and CC#2) belonging to two base stations. In CA, a PCell (primary cell) and an SCell are configured. The PCell is reliable and used to maintain connectivity to the mobile station. The SCell is additionally configured for the mobile station connecting to the PCell. For example, in the example shown in FIG. 2, one of the CCs may be configured in a PCell and the other may be configured in an SCell. While two CCs are configured in the example shown in FIG. 2, three or more CCs may be configured. A base station corresponding to the PCell is referred to as an "MeNB (Master eNB)" and a base station corresponding to the SCell is referred to as an "SeNB (Secondary eNB)". While an MeNB is a macro-cell base station providing a wider coverage and an SeNB is a small-cell base station providing a narrower coverage in the example shown in FIG. 2, the MeNB may correspond to a small-cell base station and the SeNB may correspond to a macro-cell base station.

In Dual Connectivity, when the same C-RNTI is allocated for all base stations for the same UE, coordination among the base stations is needed, and thus implementation in the network may be complicated. For this reason, it is expected that a mobile station will maintain C-RNTIs corresponding to the number of base stations in connection. A C-RNTI is an identifier for identifying a mobile station in a cell and the mobile station descrambles signals using the corresponding C-RNTI. In a reconnection procedure between a mobile station and a base station, the mobile station needs to report an identifier (PCI) of the previously-connected cell and an identifier (C-RNTI) of the mobile station to the base station in a reconnection request (RRC connection re-establishment request). In an embodiment of the present invention, the following three approaches are described to determine cell information (PCI and C-RNTI) used for a reconnection request in Dual Connectivity.

(1) First Approach

Figure 1:
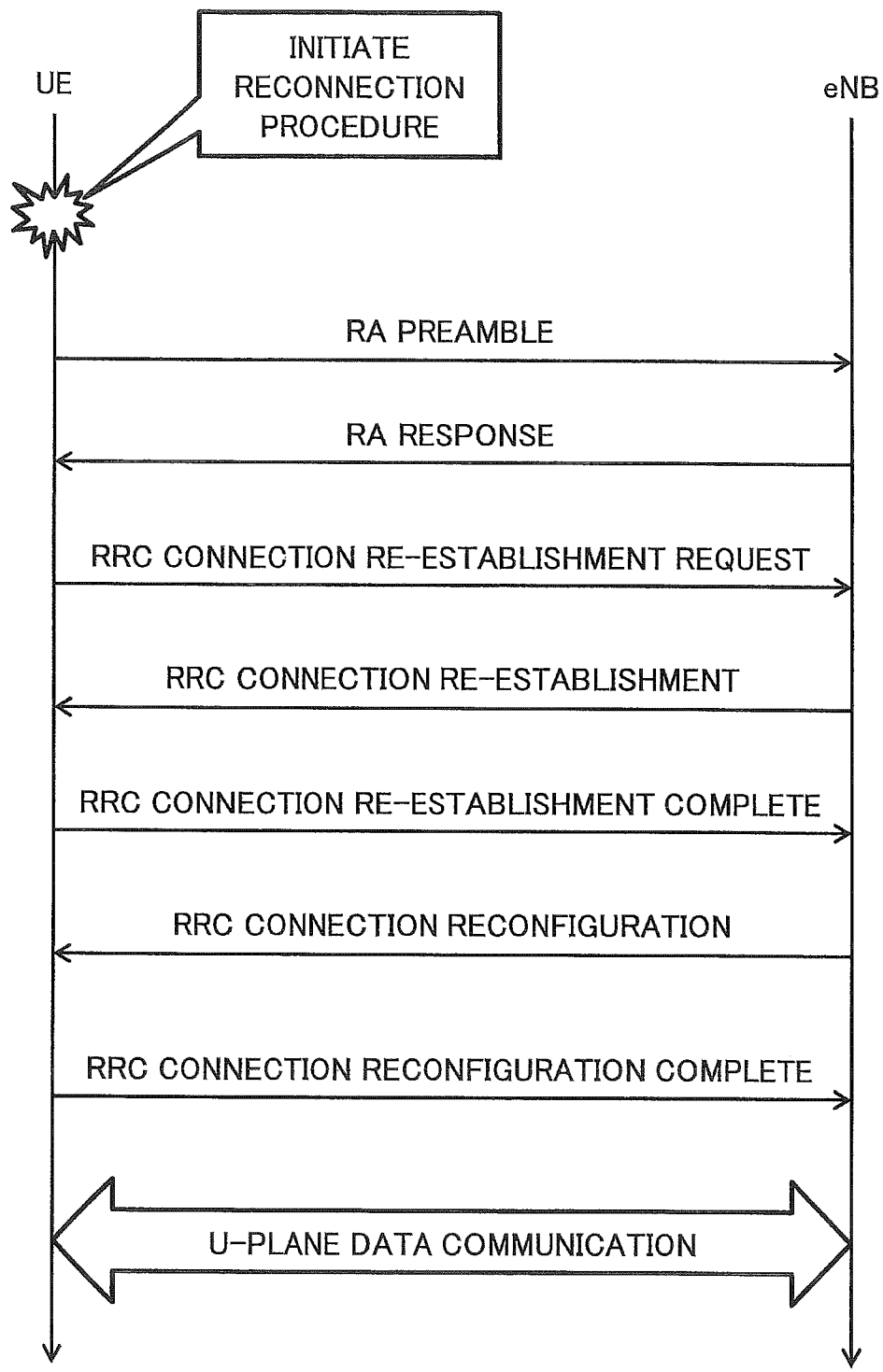
FIG. 1 shows a sequence diagram of a reconnection procedure between a mobile station and a base station.

A mobile station makes a reconnection request using information about a PCell of an MeNB. When a reconnection-target base station is the MeNB, a reconnection procedure as shown in FIG. 1 is performed between the MeNB and the mobile station. When a reconnection-target base station is an SeNB, the SeNB forwards the reconnection request to the MeNB and a reconnection procedure as shown in FIG. 1 is performed between the MeNB and the mobile station.

(2) Second Approach

A mobile station makes a reconnection request by sequentially using information about cells of previously-connected eNBs. For example, a mobile station makes a reconnection request using information about a PCell of an MeNB, and then makes a reconnection request by selecting information about an SCell of an SeNB in predetermined order when the reconnection request to the MeNB has failed. When a reconnection-target base station is the MeNB, a reconnection procedure as shown in FIG. 1 is performed between the MeNB and the mobile station. When a reconnection-target base station is the SeNB, the SeNB forwards the reconnection request to the MeNB and a reconnection procedure as shown in FIG. 1 is performed between the MeNB and the mobile station.

(3) Third Approach

A mobile station makes a reconnection request using information about a cell designated by a base station. The base station designates a cell to be used for the reconnection request by the mobile station upon configuration of Dual Connectivity. The mobile station makes a reconnection request using information about the designated cell and a reconnection procedure as shown in FIG. 1 is performed between the base station and the mobile station.

<First Approach>

In a first approach of an embodiment of the present invention, a mobile station makes a reconnection request using information about a PCell of an MeNB.

Figure 3:
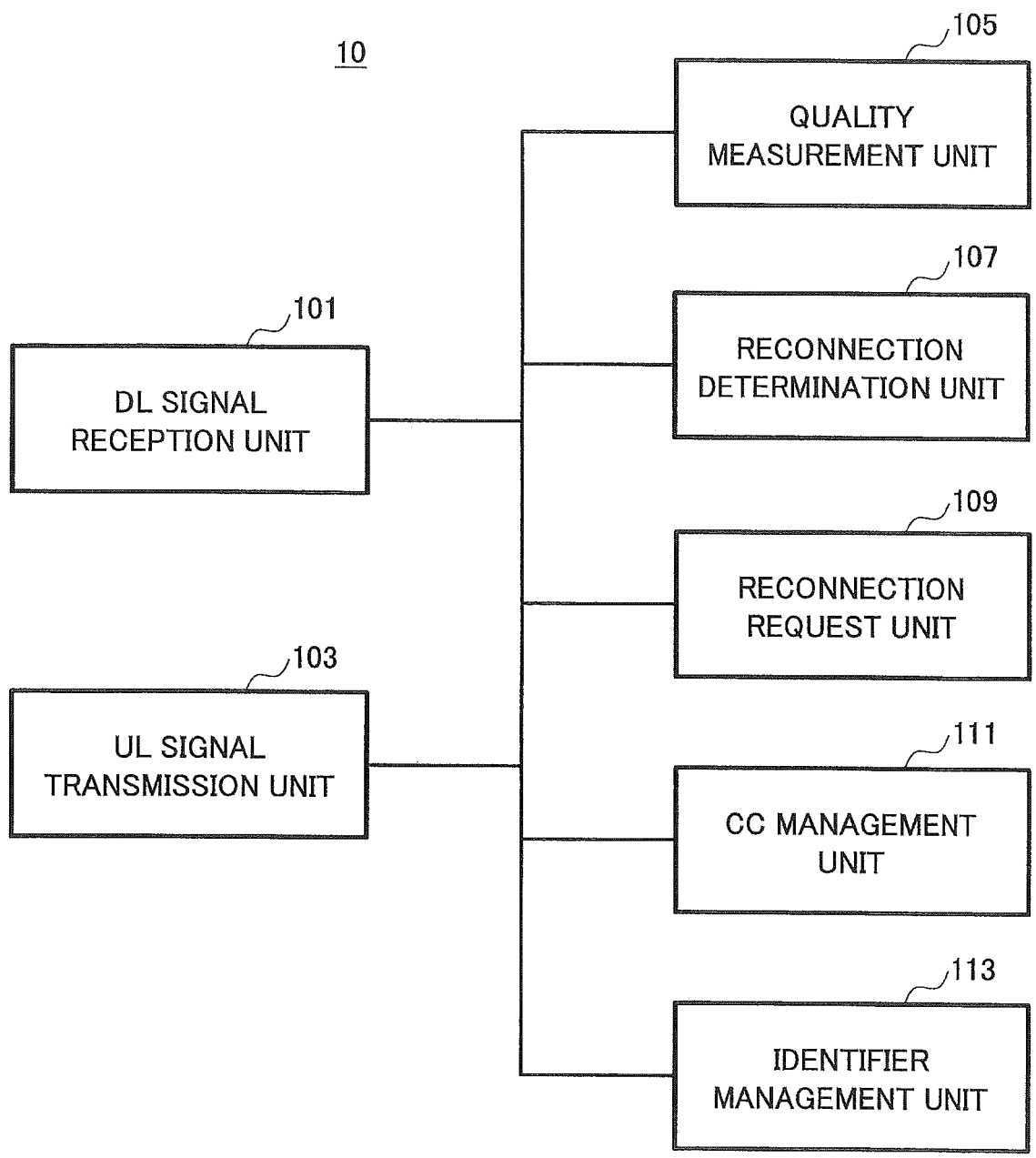
FIG. 3 shows a structural diagram of a mobile station in accordance with an embodiment of the present invention.

FIG. 3 shows a structural diagram of a mobile station 10 in accordance with the first approach of the embodiment of the present invention. The mobile station 10 includes a DL (downlink) signal reception unit 101, a UL (uplink) signal transmission unit 103, a quality measurement unit 105, a reconnection determination unit 107, a reconnection request unit 109, a CC management unit 111, and an identifier management unit 113.

The DL signal reception unit 101 receives a downlink signal from a base station. Concerning a reconnection procedure, the DL signal reception unit 101 receives messages such as an RA response, an RRC connection re-establishment, and an RRC connection reconfiguration from the base station. In addition, the DL signal reception unit 101 receives a signal for measuring reception quality associated with a base station.

The UL signal transmission unit 103 transmits an uplink signal to a base station. Concerning a reconnection procedure, the UL signal transmission unit 103 transmits messages such as an RA preamble, an RRC connection re-establishment request, an RRC connection re-establishment complete, an RRC connection reconfiguration complete to the base station.

The quality measurement unit 105 measures reception quality associated with a base station based on a predetermined signal received by the DL signal reception unit 101. The measured reception quality is used to select a base station to which the mobile station tries to connect. Since the mobile station connects to a base station (best cell) with best reception quality, the mobile station also tries to connect to the base station with best reception quality upon reconnection.

The reconnection determination unit 107 determines a trigger to initiate a reconnection procedure. For example, the reconnection determination unit 107 detects a radio link failure (for example, degradation in quality of a downlink, excess of a maximum retransmission count of RA (Random Access) preamble transmissions, excess of a maximum retransmission count in an RLC (Radio Link Control) layer, or the like), a handover failure, an integrity failure, and a reconfiguration failure.

The reconnection request unit 109 initiates a reconnection procedure with a base station. The reconnection request unit 109 generates a reconnection request (RRC connection re-establishment request) using information about a PCell of an MeNB. As described below, information about the PCell is managed by the identifier management unit 113. Specifically, the reconnection request unit 109 generates an RRC connection re-establishment request using an identifier (PCI) of the PCell, an identifier (C-RNTI) of the mobile station in the PCell, and security information (shortMAC-I) of the mobile station managed by the identifier management unit 113.

The CC management unit 111 manages a CC configured between a base station and the mobile station. Addition or deletion of a CC is ordered using an RRC connection configuration from the base station.

The identifier management unit 113 manages identifiers used in a cell to which the mobile station connects. Specifically, the identifier management unit 113 manages a PCI, a C-RNTI, and a shortMAC-I for each cell to which the mobile station connects. It should be noted that a shortMAC-I for an SeNB may not be allocated to the mobile station.

Next, a base station is described below. When an MeNB receives a reconnection request from a mobile station, a reconnection procedure is initiated as shown in FIG. 1. In other words, the base station may initiate the reconnection procedure as usual. On the other hand, when an SeNB receives a reconnection request from a mobile station, the SeNB forwards the reconnection request to the MeNB, and then a reconnection procedure is initiated between the MeNB and the mobile station as shown in FIG. 1. In the latter case, a specific configuration of the SeNB is described in detail below.

Figure 4:
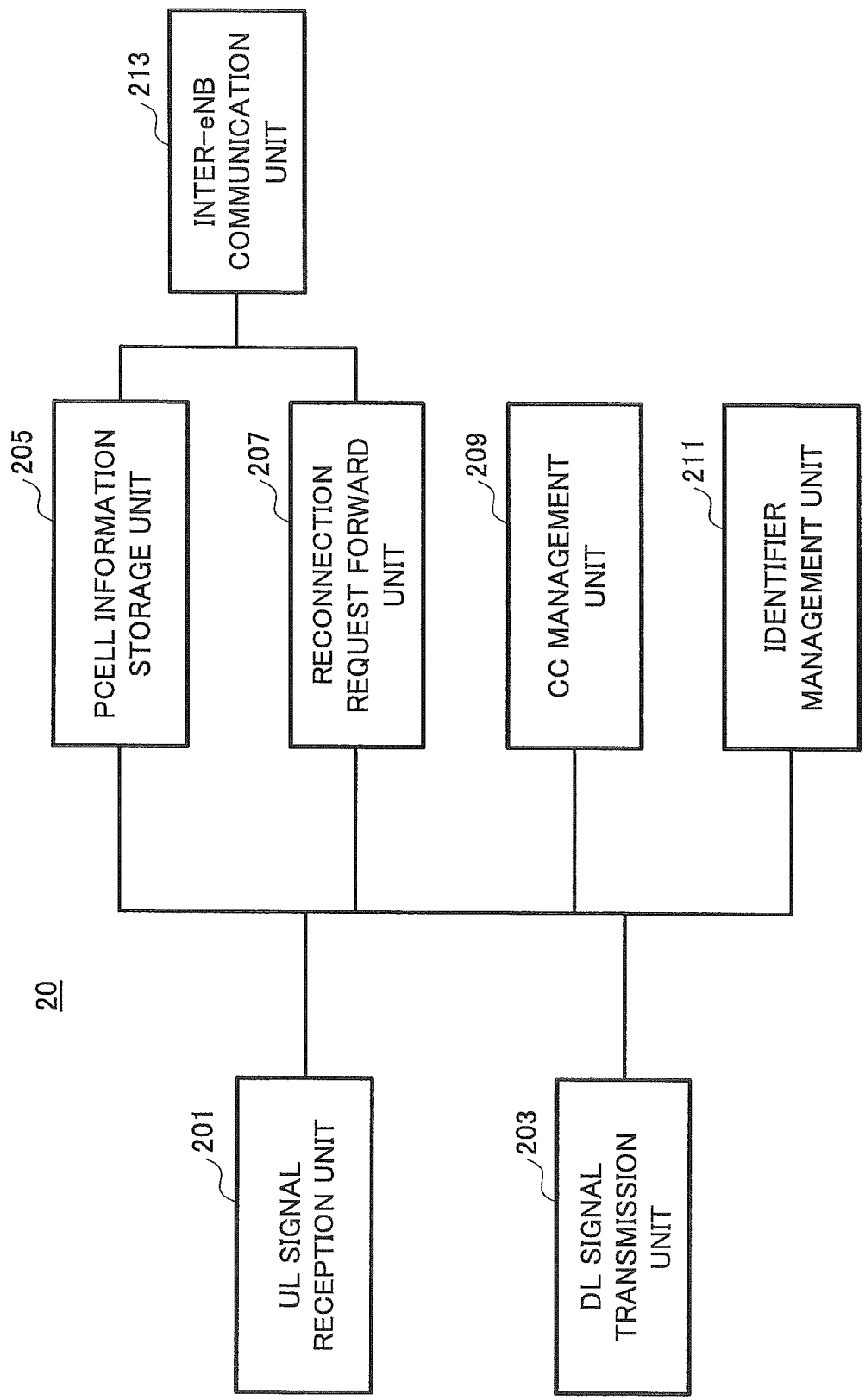
FIG. 4 shows a structural diagram of a base station in accordance with a first approach or a second approach of an embodiment of the present invention.

FIG. 4 shows a structural diagram of a base station 20 in accordance with the first approach of the embodiment of the present invention. The base station 20 includes a UL signal reception unit 201, a DL signal transmission unit 203, a PCell information storage unit 205, a reconnection request forward unit 207, a CC management unit 209, an identifier management unit 211, and an inter-eNB communication unit 213.

The UL signal reception unit 201 receives a signal from a mobile station. Concerning a reconnection procedure, the UL signal reception unit 201 receives messages such as an RA preamble and an RRC connection re-establishment request from the mobile station.

The DL signal transmission unit 203 transmits a signal to a mobile station. Concerning a reconnection procedure, the DL signal transmission unit 203 transmits messages such as an RA response to the mobile station.

The PCell information storage unit 205 stores information about a PCell received via the inter-eNB communication unit 213 from the MeNB. Specifically, the PCell information storage unit 205 receives a PCI and a C-RNTI of the PCell from the MeNB upon addition of an SCell and stores the received PCI and C-RNTI. The inter-eNB communication unit 213 is an interface to communicate between eNBs.

The reconnection request forward unit 207 forwards, via the inter-eNB communication unit 213, a reconnection request (RRC connection re-establishment request) received from a mobile station to the MeNB. Specifically, when an RRC connection re-establishment request is received from a mobile station, the reconnection request forward unit 207 checks whether a PCI and a C-RNTI included in the RRC connection re-establishment request match the PCI and the C-RNTI of the PCell stored in the PCell information storage unit 205. When there is a match, the reconnection request forward unit 207 forwards the RRC connection re-establishment request to the MeNB.

The CC management unit 209 manages a CC configured for a mobile station. Addition or deletion of a CC is ordered using an RRC connection configuration from the base station.

The identifier management unit 211 manages identifiers assigned to a mobile station for communication. Specifically, the identifier management unit 211 manages a C-RNTI and a shortMAC-I assigned to the mobile station. It should be noted that a shortMAC-I for an SeNB may not be allocated to the mobile station.

As described above, the inter-eNB communication unit 213 is an interface to communicate between eNBs.

When the MeNB receives an RRC connection re-establishment request forwarded by the SeNB, messages such as an RRC connection re-establishment, an RRC connection re-establishment complete, an RRC connection reconfiguration, and an RRC connection reconfiguration complete are exchanged between the MeNB and the mobile station to complete a reconnection procedure.

It should be noted that the SeNB may not only forward an RRC connection re-establishment request to the MeNB but also receive its response, that is, an RRC connection re-establishment from the MeNB and forward the response to the mobile station. In addition, the SeNB may forward other messages (RRC connection re-establishment complete, RRC connection reconfiguration, RRC connection reconfiguration complete) in the reconnection procedure shown in FIG. 1 to the MeNB or the mobile station.

Figure 5:
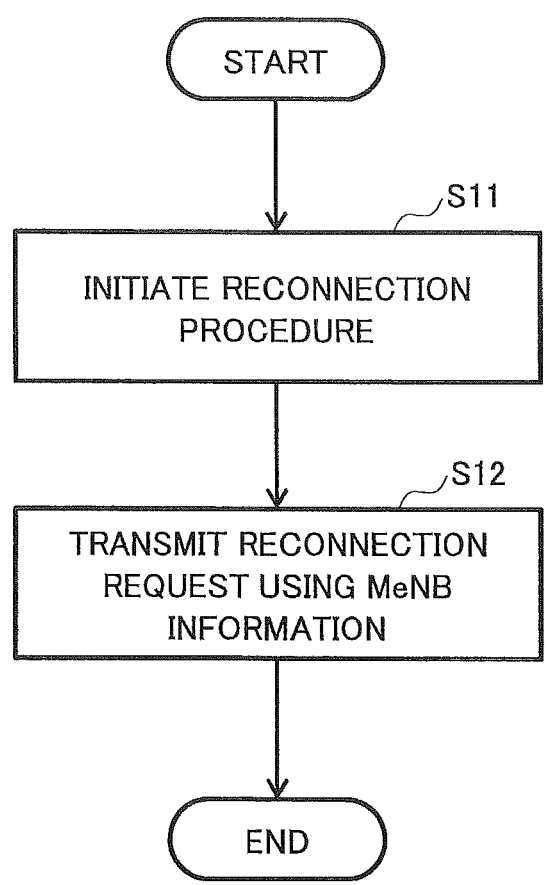
FIG. 5 shows a flowchart of a reconnection request method in accordance with the first approach of the embodiment of the present invention.

FIG. 5 shows a reconnection request method in accordance with the first approach of the embodiment of the present invention. The method shown in FIG. 5 illustrates a procedure performed by a mobile station.

When the reconnection determination unit 107 in the mobile station detects a trigger to initiate a reconnection procedure, the reconnection request unit 109 in the mobile station initiates a reconnection procedure with the base station (step S11).

The reconnection request unit 109 generates a reconnection request (RRC connection re-establishment request) and transmits the reconnection request to the base station (step S12). Specifically, the reconnection request unit 109 generates an RRC connection re-establishment request using the PCI, the C-RNTI and the shortMAC-I of the PCell managed by the identifier management unit 113, and then transmits the RRC connection re-establishment request.

Figure 6:
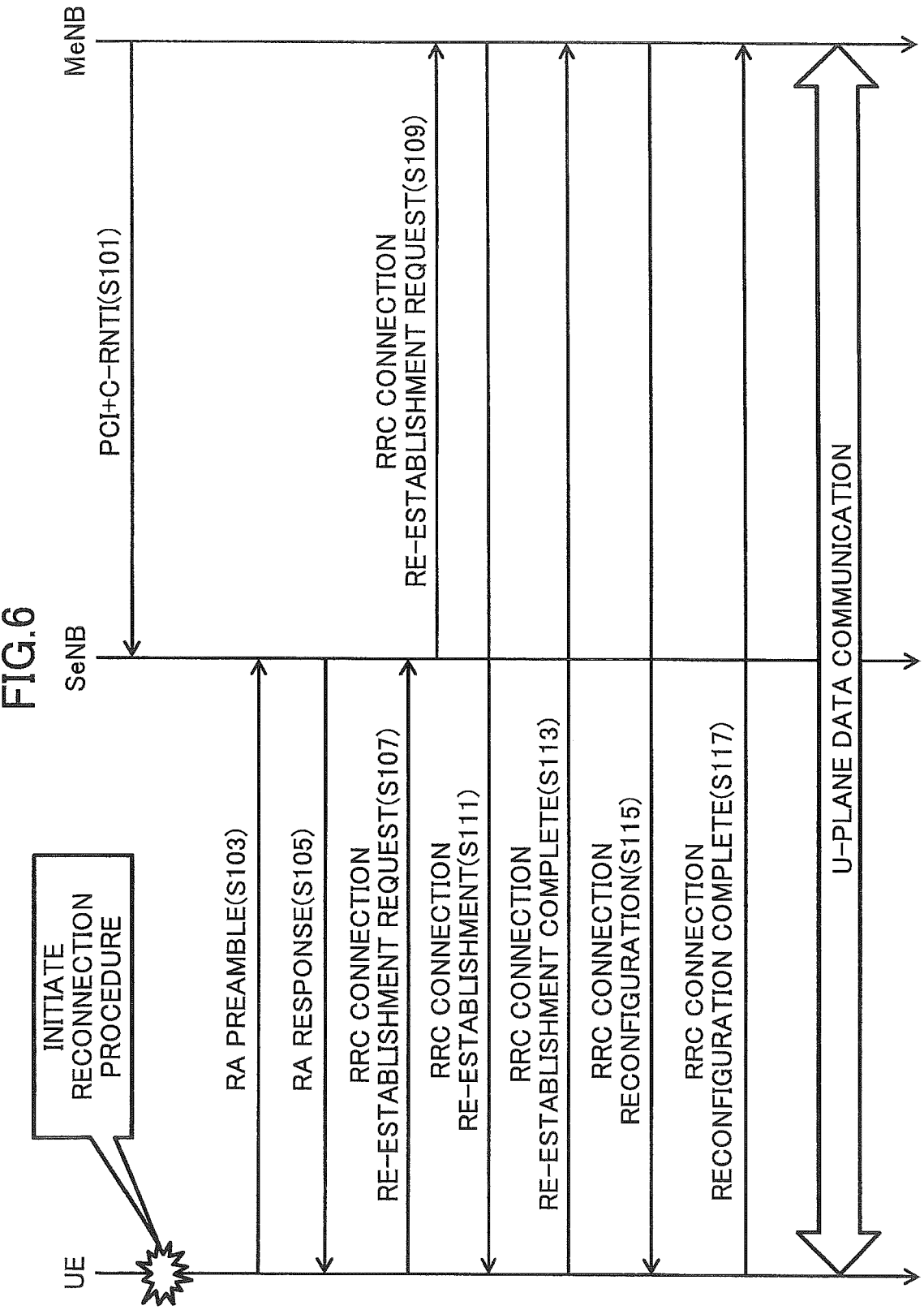
FIG. 6 shows a sequence diagram of a reconnection procedure between a mobile station and a base station in accordance with the first approach of the embodiment of the present invention.

FIG. 6 shows a reconnection procedure between a mobile station and a base station in accordance with the first approach of the embodiment of the present invention.

Prior to a reconnection procedure, an MeNB transmits information (PCI and C-RNTI) about a PCell to an SeNB (step S101). Upon addition of an SCell, the information about the PCell is received via the inter-eNB communication unit 213 in the SeNB and stored in the PCell information storage unit 205 in the SeNB.

When the reconnection determination unit 107 in the mobile station detects a trigger to initiate a reconnection procedure, the reconnection request unit 109 in the mobile station initiates a reconnection procedure with the base station. When reception quality of the MeNB is better and the mobile station requests a reconnection to the MeNB, a reconnection procedure as shown in FIG. 1 is performed. The procedure is not repeated herein. When reception quality of the SeNB is better and the mobile station requests a reconnection to the SeNB, the reconnection request unit 109 in the mobile station transmits an RA preamble to the SeNB (step S103). Then, the mobile station receives an RA response including transmission allocation information from the SeNB (step S105).

The reconnection request unit 109 in the mobile station generates an RRC connection re-establishment request using the PCI and the C-RNTI of the PCell and transmits the RRC connection re-establishment request to the SeNB (step S107).

The reconnection request forward unit 207 in the SeNB checks whether the PCI and the C-RNTI included in the RRC connection re-establishment request received from the mobile station match the PCI and the C-RNTI stored in the PCell information storage unit 205. When there is a match, the reconnection request forward unit 207 forwards the RRC connection re-establishment request to the MeNB (step S109).

Then, the reconnection procedure is performed between the mobile station and the MeNB, where an RRC connection re-establishment (step S111), an RRC connection re-establishment complete (step S113), an RRC connection reconfiguration (step S115), and an RRC connection reconfiguration complete (step S117) are transmitted and received.

While FIG. 6 shows that the RRC connection re-establishment, the RRC connection re-establishment complete, the RRC connection reconfiguration, and the RRC connection reconfiguration complete are transmitted and received between the mobile station and the MeNB, one or more of these messages may be transmitted or received via the SeNB.

<Second Approach>

In a second approach of an embodiment of the present invention, a mobile station makes a reconnection request by sequentially using information about cells of previously-connected eNBs. For example, a mobile station makes a reconnection request using information about a PCell of an MeNB, and then makes a reconnection request by selecting information about an SCell of an SeNB in predetermined order when the reconnection request to the MeNB has failed.

A mobile station 10 in accordance with the second approach of the embodiment of the present invention is configured as shown in FIG. 3. The DL signal reception unit 101, the UL signal transmission unit 103, the quality measurement unit 105, the reconnection determination unit 107, the CC management unit 111, and the identifier management unit 113 are configured in the same manner as the corresponding units described with reference to FIG. 3, and thus their repeated descriptions are omitted. Concerning a reconnection procedure, the DL signal reception unit 101 receives an RRC connection re-establishment reject when a reconnection request (RRC connection re-establishment request) has failed.

The reconnection request unit 109 initiates a reconnection procedure with a base station. The reconnection request unit 109 selects information about a PCell and information about an SCell in predetermined order to generate a reconnection request (RRC connection re-establishment request). For example, the reconnection request unit 109 generates a reconnection request using information (PCI, C-RNTI, and shortMAC-I) about the PCell of the MeNB stored in the identifier management unit 113, and when the reconnection request has failed, the reconnection request unit 109 generates a reconnection request using information (PCI, C-RNTI, and shortMAC-I) about the SCell of the SeNB. When the shortMAC-I for the SeNB is not allocated to the mobile station, the shortMAC-I for the MeNB or a dummy shortMAC-I may be used instead. When a plurality of SCells are configured, information about an SCell may be selected in ascending/descending order of eNB Index, in ascending/descending order of SCell Index, or in order of better quality among the SCells. The generated RRC connection re-establishment request is transmitted via the UL signal transmission unit 103 to a base station with better reception quality.

The failure of the reconnection request includes the case where an RRC connection re-establishment reject is received from the base station due to an inappropriate identifier used in the RRC connection re-establishment request and the case where no response to the RRC connection re-establishment request is received before a timer (T301) expires.

Next, a base station is described below. When an MeNB receives a reconnection request from a mobile station, a reconnection procedure is initiated as shown in FIG. 1. In other words, the base station may initiate the reconnection procedure as usual. On the other hand, when an SeNB receives a reconnection request from a mobile station, the SeNB forwards the reconnection request to the MeNB, and then a reconnection procedure is initiated between the MeNB and the mobile station as shown in FIG. 1. In the latter case, a specific configuration of the SeNB is described in detail below.

A base station 20 in accordance with the second approach of the embodiment of the present invention is configured as shown in FIG. 4. The UL signal reception unit 201, the DL signal transmission unit 203, the CC management unit 209, and the identifier management unit 211 are configured in the same manner as the corresponding units described with reference to FIG. 4, and thus their repeated descriptions are omitted. In the second approach, an SeNB need not receive information about a PCell of an MeNB in advance, the PCell information storage unit 205 may not be included in the base station 20.

The reconnection request forward unit 207 forwards, via the inter-eNB communication unit 213, a reconnection request (RRC connection re-establishment request) received from a mobile station to the MeNB. Specifically, when an RRC connection re-establishment request is received from a mobile station, the reconnection request forward unit 207 checks whether a PCI and a C-RNTI included in the RRC connection re-establishment request match the PCI and the C-RNTI of the own base station 20. When there is a match, the reconnection request forward unit 207 forwards the RRC connection re-establishment request to the MeNB. The RRC connection re-establishment request forwarded to the MeNB includes a PCI and a C-RNTI of the own SeNB. On the other hand, when the PCI and the C-RNTI included in the RRC connection re-establishment request do not match the PCI and the C-RNTI of the own base station 20, an RRC connection re-establishment reject is transmitted to the mobile station.

When the MeNB receives an RRC connection re-establishment request, messages such as an RRC connection re-establishment, an RRC connection re-establishment complete, an RRC connection reconfiguration, and an RRC connection reconfiguration complete are exchanged between the MeNB and the mobile station to complete a reconnection procedure. When the MeNB receives an RRC connection re-establishment request including information of the SeNB, the MeNB determines that the reconnection request is forwarded by the SeNB and initiates a reconnection procedure with the mobile station.

It should be noted that the SeNB may not only forward an RRC connection re-establishment request to the MeNB but also receive its response, that is, an RRC connection re-establishment from the MeNB and forward the response to the mobile station. In addition, the SeNB may forward other messages (RRC connection re-establishment complete, RRC connection reconfiguration, RRC connection reconfiguration complete) in the reconnection procedure shown in FIG. 1 to the MeNB or the mobile station.

Figure 7:
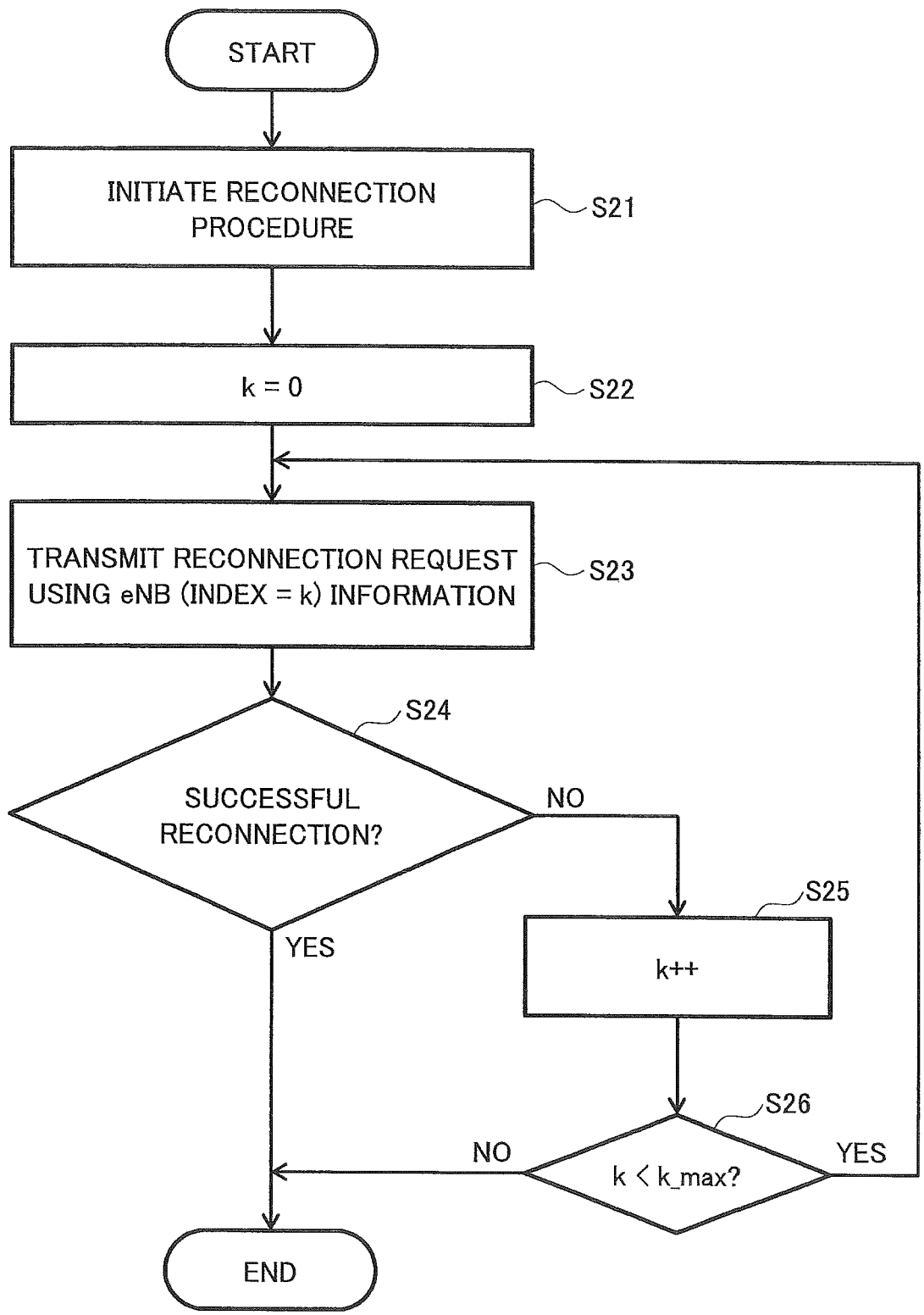
FIG. 7 shows a flowchart of a reconnection request method in accordance with the second approach of the embodiment of the present invention.

FIG. 7 shows a reconnection request method in accordance with the second approach of the embodiment of the present invention. The method shown in FIG. 7 illustrates a procedure performed by a mobile station.

When the reconnection determination unit 107 in the mobile station detects a trigger to initiate a reconnection procedure, the reconnection request unit 109 in the mobile station initiates a reconnection procedure with the base station (step S21).

The reconnection request unit 109 selects information about a PCell and information about an SCell in predetermined order to generate a reconnection request (RRC connection re-establishment request). It is assumed herein that an index k is assigned to each eNB. k=0 may be assigned to the MeNB and k=1, . . . , k_max may be assigned to SeNBs in ascending/descending order of eNB Index. Alternatively, k=1, . . . , k_max may be assigned to SeNBs in ascending/descending order of SCell Index or in order of better quality among the SCells, where k_max is the number of base stations to which the mobile station connects.

First, the index is set to k=0 (step S22) and the reconnection request unit 109 generates a reconnection request (RRC connection re-establishment request) using information about the PCell of the MeNB and transmits the reconnection request to the base station (step S23). Specifically, the reconnection request unit 109 generates an RRC connection re-establishment request using the PCI, the C-RNTI and the shortMAC-I of the PCell managed by the identifier management unit 113, and then transmits the RRC connection re-establishment request. When the reconnection is successfully completed between the mobile station and the MeNB (step S24: YES), this method comes to an end.

When the reconnection has failed (step S24: NO), the index k is incremented and a reconnection is attempted using information of a next base station (step S25). When the index k is less than k_max (step S26: YES), a reconnection request is generated using information about the SCell of the SeNB represented by the index k and the reconnection request is transmitted to the base station (step S23). These steps are repeated until the index k is more than or equal to k_max.

Figure 8:
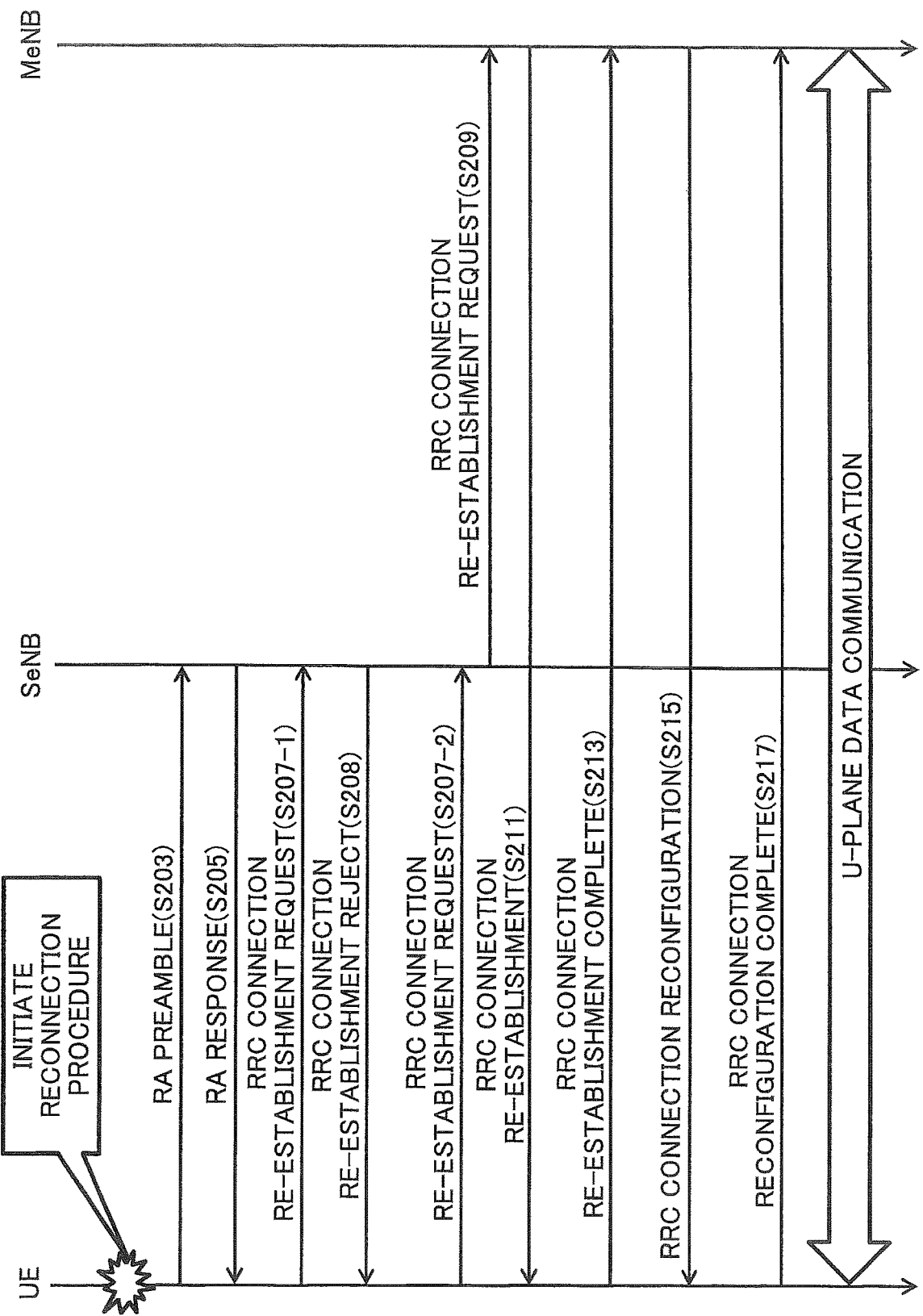
FIG. 8 shows a sequence diagram of a reconnection procedure between a mobile station and a base station in accordance with the second approach of the embodiment of the present invention.

FIG. 8 shows a reconnection procedure between a mobile station and a base station in accordance with the second approach of the embodiment of the present invention.

When the reconnection determination unit 107 in the mobile station detects a trigger to initiate a reconnection procedure, the reconnection request unit 109 in the mobile station initiates a reconnection procedure with the base station. When reception quality of the MeNB is better and the mobile station requests a reconnection to the MeNB, a reconnection procedure as shown in FIG. 1 is performed. The procedure is not repeated herein. When reception quality of the SeNB is better and the mobile station requests a reconnection to the SeNB, the reconnection request unit 109 in the mobile station transmits an RA preamble to the SeNB (step S203). Then, the mobile station receives an RA response including transmission allocation information from the SeNB (step S205).

The reconnection request unit 109 in the mobile station generates an RRC connection re-establishment request using the PCI and the C-RNTI of the PCell and transmits the RRC connection re-establishment request to the SeNB (step S207-1).

Since the PCI and the C-RNTI included in the RRC connection re-establishment request do not match the PCI and the C-RNTI of the own SeNB, the reconnection request transfer unit 207 in the SeNB transmits the RRC connection re-establishment reject to the mobile station (step S208).

Then, the reconnection request unit 109 in the mobile station generates an RRC connection re-establishment request using the PCI and the C-RNTI of the SCell and transmits the RRC connection re-establishment request to the SeNB (step S207-2). When a plurality of SCells are configured, the PCI and the C-RNTI of the SCell is used in ascending/descending order of eNB Index, in ascending/descending order of SCell Index, or in order of better quality among the SCells.

The reconnection request forward unit 207 in the SeNB checks whether the PCI and the C-RNTI included in the RRC connection re-establishment request received from the mobile station match the PCI and the C-RNTI of the own SeNB. When there is a match, the reconnection request forward unit 207 forwards the RRC connection re-establishment request to the MeNB (step S209).

Then, the reconnection procedure is performed between the mobile station and the MeNB, where an RRC connection re-establishment (step S211), an RRC connection re-establishment complete (step S213), an RRC connection reconfiguration (step S215), and an RRC connection reconfiguration complete (step S217) are transmitted and received.

While FIG. 8 shows that the RRC connection re-establishment, the RRC connection re-establishment complete, the RRC connection reconfiguration, and the RRC connection reconfiguration complete are transmitted and received between the mobile station and the MeNB, one or more of these messages may be transmitted or received via the SeNB.

In the second approach, since the mobile station sequentially selects information about a cell and makes a reconnection request, it may take a long time to complete a reconnection. For this reason, the mobile station includes a timer (T301) to determine that the reconnection request has failed. Specifically, the mobile station transmits an RRC connection re-establishment request to a base station with best reception quality. When the mobile station does not receive an RRC connection re-establishment before the timer (T301) expires, the mobile station determines that the reconnection request has failed. From the viewpoint of delay for the user in the reconnection, the mobile station may include a timer setting unit (not shown) configured to change a value of the timer (T301) each time information about a cell to be transmitted in the RRC connection re-establishment request is changed. For example, when a reconnection request is generated by using information of an MeNB, the timer may be set to T301=1 sec, and when a reconnection request is generated by using information of an SeNB, the timer may be set to T301=300 ms. Alternatively, the value of T301 may be provided via RRC signaling from the base station.

<Third Approach>

In a third approach of an embodiment of the present invention, a mobile station makes a reconnection request using information about a cell designated by a base station. For example, when an MeNB is a small-cell base station, there is a high probability that a reconnection will be successful by performing a reconnection procedure in a macro cell. For this reason, the base station designates a reconnection-target cell for the mobile station and the mobile station makes a reconnection request using information about the cell designated by the base station.

A mobile station 10 in accordance with the third approach of the embodiment of the present invention is configured as shown in FIG. 3. The UL signal transmission unit 103, the quality measurement unit 105, the reconnection determination unit 107, the CC management unit 111, and the identifier management unit 113 are configured in the same manner as the corresponding units described with reference to FIG. 3, and thus their repeated descriptions are omitted.

The DL signal reception unit 101 receives a downlink signal from a base station. Concerning a reconnection procedure, the DL signal reception unit 101 receives information about a cell (reconnection-target cell) used for a reconnection request. Information about the reconnection-target cell may be received from the base station upon configuration of Dual Connectivity. For example, information about the reconnection-target cell may be a flag configured upon addition of an SCell. When the flag is configured (set), the mobile station 10 may determine that the cell indicated by the flag is a reconnection-target cell. When the flag is not configured (not set), the mobile station 10 may determine that a default cell (for example, PCell, a cell with best reception quality, a cell with the smallest/largest SCell Index, a cell with the smallest/largest Cell Index) is a reconnection-target cell. When the flag has been already configured in a cell and then a flag is subsequently received, the mobile station 10 may determine a reconnection-target cell according to the latest flag. A flag indicating a reconnection-target cell is managed together with a cell identifier by the identifier management unit 113.

As described with reference to FIG. 3, concerning a reconnection procedure, the DL signal reception unit 101 receives messages such as an RA response, an RRC connection re-establishment, and an RRC connection reconfiguration from the base station. In addition, the DL signal reception unit 101 receives a signal for measuring reception quality associated with a base station.

The reconnection request unit 109 initiates a reconnection procedure with a base station. The reconnection request unit 109 generates a reconnection request (RRC connection re-establishment request) using information about a reconnection-target cell designated by the base station. Specifically, the reconnection request unit 109 generates an RRC connection re-establishment request using a PCI, a C-RNTI, and a shortMAC-I of the reconnection-target cell according to the flag indicating the reconnection-target cell managed by the identifier management unit 113. When the flag indicating the reconnection-target cell is not configured, the reconnection request unit 109 generates an RRC connection re-establishment request using a PCI, a C-RNTI, and a shortMAC-I of a default cell. When the shortMAC-I for the SeNB is not allocated to the mobile station, the shortMAC-I for the MeNB or a dummy shortMAC-I may be used instead.

Next, a base station is described below. The base station designates a cell (reconnection-target cell) to be transmitted in a reconnection request for the mobile station. When the base station of the reconnection-target cell receives the reconnection request transmitted from the mobile station, a reconnection procedure is initiated as shown in FIG. 1. In other words, the base station may initiate the reconnection procedure as usual. When a base station other than the base station of the reconnection-target cell receives the reconnection request transmitted from the mobile station, the base station forwards the reconnection request to the base station of the reconnection-target cell, and then a reconnection procedure is initiated between the base station of the reconnection-target cell and the mobile station as shown in FIG. 1. In the latter case, a specific configuration of the base station is described in detail below.

Figure 9:
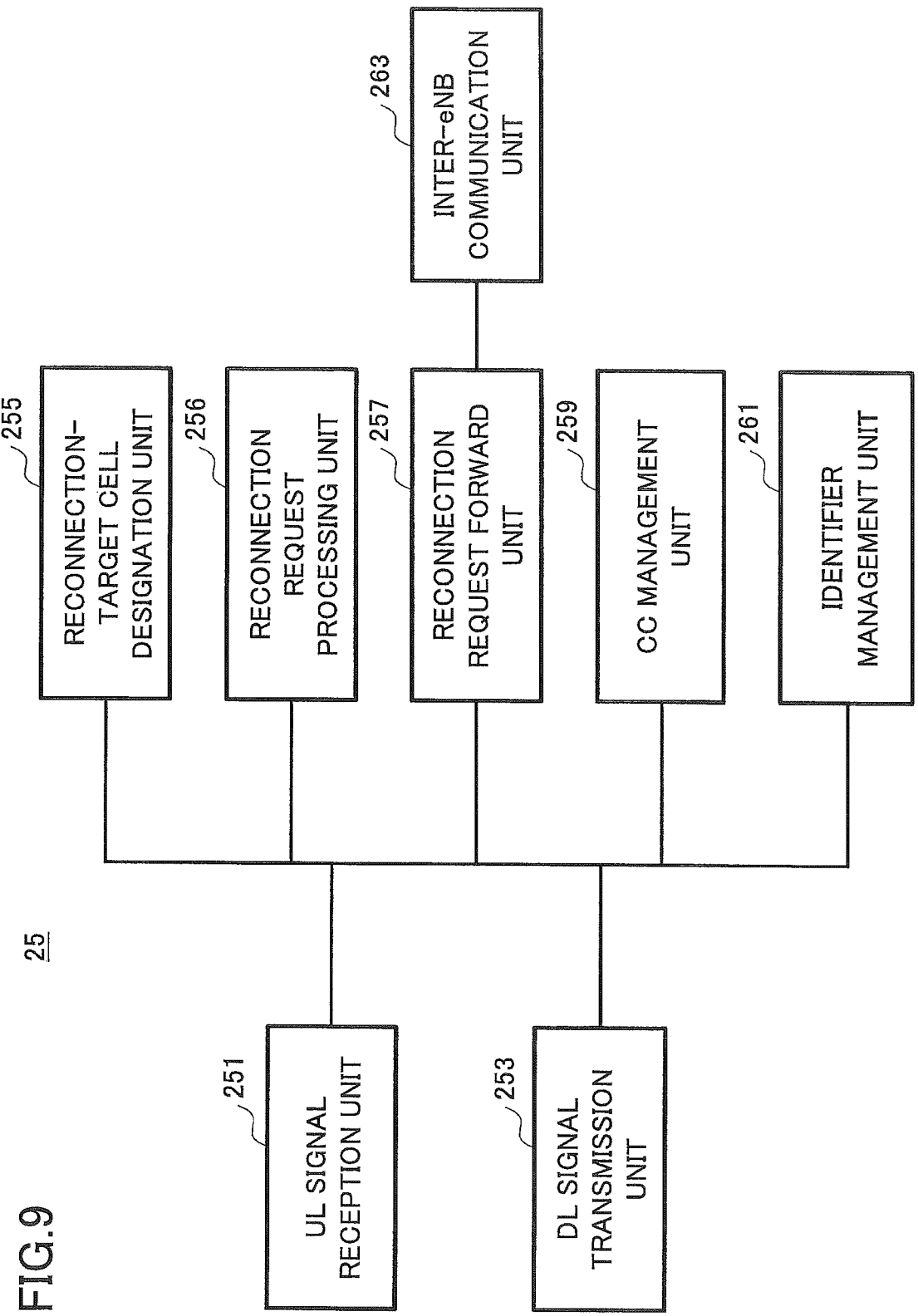
FIG. 9 shows a structural diagram of a base station in accordance with a third approach of an embodiment of the present invention.

FIG. 9 shows a structural diagram of a base station 25 in accordance with the third approach of the embodiment of the present invention. The base station 25 includes a UL signal reception unit 251, a DL signal transmission unit 253, a reconnection-target cell designation unit 255, a reconnection request processing unit 256, a reconnection request forward unit 257, a CC management unit 259, an identifier management unit 261, and an inter-eNB communication unit 263. The UL signal reception unit 251, the DL signal transmission unit 253, the CC management unit 259, the identifier management unit 261, and the inter-eNB communication unit 263 are configured in the same manner as the UL signal reception unit 201, the DL signal transmission unit 203, the CC management unit 209, the identifier management unit 211, and the inter-eNB communication unit 213 shown in FIG. 4, respectively.

The reconnection-target cell designation unit 255 designates a cell (reconnection-target cell) to be transmitted in a reconnection request for the mobile station. The reconnection-target cell may be designated using a flag upon configuration of Dual Connectivity. As described above, when the flag is configured, the mobile station may determine that the cell indicated by the flag is a reconnection-target cell. When the flag is not configured, the mobile station may treat a default cell as a reconnection-target cell. In addition, when the reconnection-target cell is changed, the reconnection-target cell designation unit 255 may designate a flag indicating a reconnection-target cell again. As described above, when the flag has been already configured in a cell and then a flag is subsequently received, the mobile station may determine a reconnection-target cell according to the latest flag. Alternatively, when the reconnection-target cell is changed, the reconnection-target cell designation unit 255 may invalidate the flag indicating the currently-configured cell and designate a flag indicating a reconnection-target cell. Correspondingly, when the reconnection-target cell is changed, the reconnection-target cell designation unit 255 may delete the flag indicating the currently-configured cell and add a flag indicating a reconnection-target cell.

The reconnection request processing unit 256 initiates a reconnection procedure with the mobile station, when a reconnection request (RRC connection-reestablishment request) received from a mobile station is destined for the own base station. A specific reconnection procedure is the same as the procedure shown in FIG. 1.

The reconnection request forward unit 257 forwards, via the inter-eNB communication unit 213, the reconnection request (RRC connection re-establishment request) received from the mobile station to a base station of the reconnection-target cell, when the reconnection request is not destined for the base station.

Figure 10:
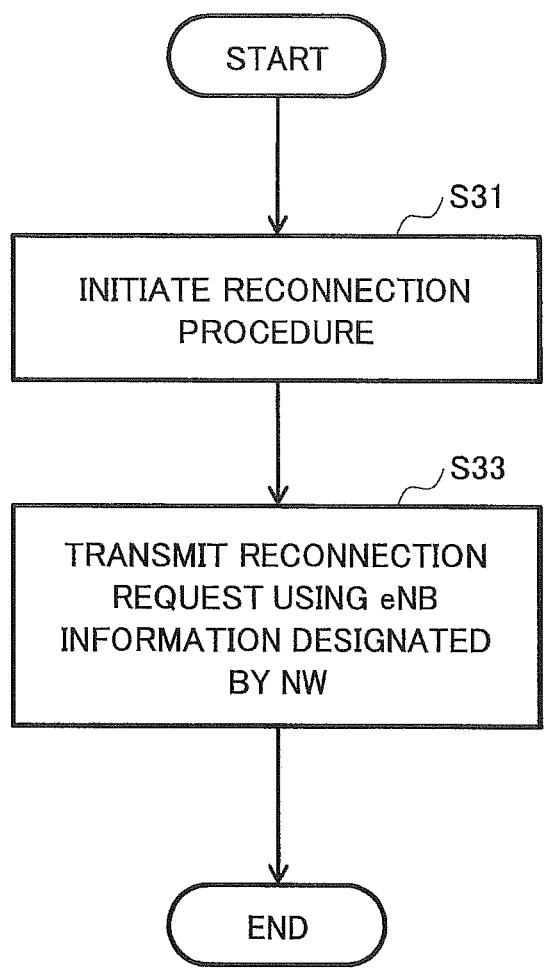
FIG. 10 shows a flowchart of a reconnection request method in accordance with the third approach of the embodiment of the present invention.

FIG. 10 shows a reconnection request method in accordance with the third approach of the embodiment of the present invention. The method shown in FIG. 10 illustrates a procedure performed by a mobile station.

When the reconnection determination unit 107 in the mobile station detects a trigger to initiate a reconnection procedure, the reconnection request unit 109 in the mobile station initiates a reconnection procedure with the base station (step S31).

The reconnection request unit 109 generates a reconnection request (RRC connection re-establishment request) using information about a reconnection-target cell designated by the base station and transmits the reconnection request to the base station (step S32). Specifically, the reconnection request unit 109 generates an RRC connection re-establishment request using the PCI, the C-RNTI and the shortMAC-I of the reconnection-target cell according to a flag indicating the reconnection-target cell managed by the identifier management unit 113, and then transmits the RRC connection re-establishment request.

Figure 11:
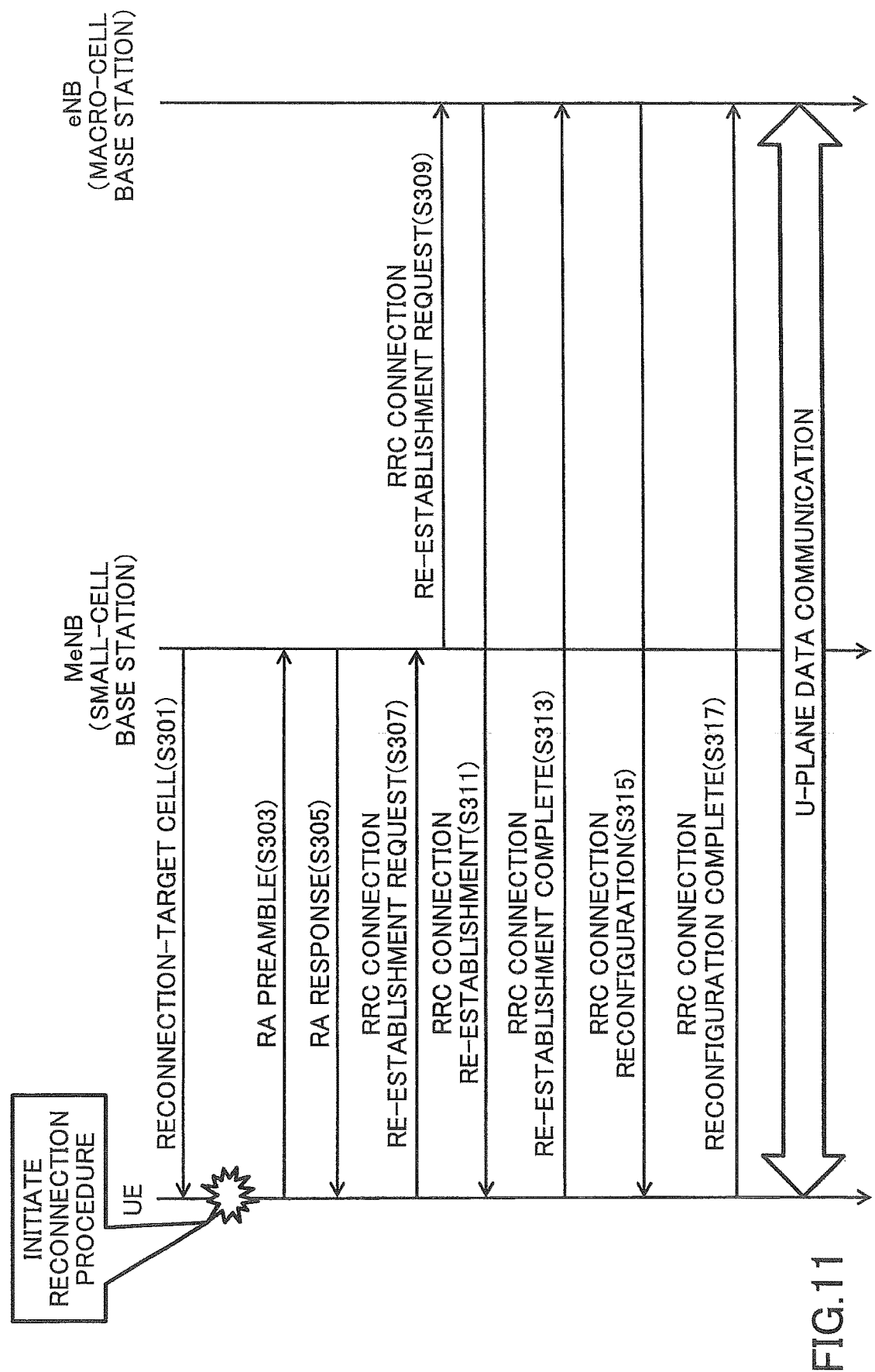
FIG. 11 shows a sequence diagram of a reconnection procedure between a mobile station and a base station in accordance with the third approach of the embodiment of the present invention.

FIG. 11 shows a reconnection procedure between a mobile station and a base station in accordance with the third approach of the embodiment of the present invention. In FIG. 11, a description is given below assuming that an MeNB that is a small-cell base station designates a macro-cell base station as a reconnection-target cell.

Upon configuration of Dual Connectivity, the MeNB notifies the mobile station of a reconnection-target cell (step S301). Information about the reconnection-target cell is stored in the cell information storage unit 105 in the mobile station.

When the reconnection determination unit 107 in the mobile station detects a trigger to initiate a reconnection procedure, the reconnection request unit 109 in the mobile station initiates a reconnection procedure using information about the designated reconnection-target cell. When reception quality of a macro cell is better and the mobile station requests a reconnection to a macro-cell base station, a reconnection procedure as shown in FIG. 1 is performed. The procedure is not repeated herein. When reception quality of a small cell is better and the mobile station requests a reconnection to a small-cell base station, the reconnection request unit 109 in the mobile station transmits an RA preamble to the small-cell base station (step S303). Then, the mobile station receives an RA response including transmission allocation information from the small-cell base station (step S305).

The reconnection request unit 109 in the mobile station generates an RRC connection re-establishment request using the PCI and the C-RNTI of the designated reconnection-target cell and transmits the RRC connection re-establishment request to the small-cell base station (step S307).

The reconnection request forward unit 207 in the small-cell base station checks whether the PCI and the C-RNTI included in the RRC connection re-establishment request received from the mobile station match the PCI and the C-RNTI of the small-cell base station. When they do not match, the reconnection request forward unit 207 forwards the RRC connection re-establishment request to the base station of the reconnection-target cell (step S309).

Then, the reconnection procedure is performed between the mobile station and the macro cell base station, where an RRC connection re-establishment (step S311), an RRC connection re-establishment complete (step S313), an RRC connection reconfiguration (step S315), and an RRC connection reconfiguration complete (step S317) are transmitted and received.

While FIG. 11 shows that the RRC connection re-establishment, the RRC connection re-establishment complete, the RRC connection reconfiguration, and the RRC connection reconfiguration complete are transmitted and received between the mobile station and the macro-cell base station, one or more of these messages may be transmitted or received via the small-cell base station.

Effects of an Embodiment of the Present Invention

According to an embodiment of the present invention, it is possible to implement a reconnection to a base station when a mobile station performs communication using CCs belonging to different base stations.

According to the first approach, a base station forwards a reconnection request to a suitable base station. Thus, a mobile station need only use information about a PCell. Accordingly, a reconnection procedure in the mobile station can be simplified.

According to the second approach, a mobile station sequentially makes a reconnection request to a base station. Thus, information about a cell need not be exchanged in advance between base stations. Although delay for a user may occur upon a reconnection, the delay for the user can be reduced by configuring a timer (T301) to determine that the reconnection request has failed.

In the first and second approaches, a mobile station preferentially connects to an MeNB. When the MeNB is a small-cell base station and a reconnection to a macro-cell base station is preferable from the viewpoint of the probability of successful reconnection, the third approach can be used. According to the third approach, a base station can designate a reconnection-target cell. Thus, it is possible to designate a macro cell as a reconnection-target cell with a high probability of successful reconnection.

For convenience of explanation, the base station and the mobile station according to the embodiments of the present invention have been described with reference to functional block diagrams, but the base station and the mobile station may be implemented in hardware, software, or combinations thereof. In addition, two or more functional elements may be combined as appropriate. Furthermore, the method according to the embodiments of the present invention may be carried out in a different order from the order shown in the embodiments.

While the approaches are described above to implement a reconnection to a base station when a mobile station performs communication using CCs belonging to different base stations, the present invention is not limited to the these embodiments, and variations, modifications, alterations, and substitutions can be made by those skilled in the art without deviating from the spirit of the present invention.

The present international application is based on and claims the benefit of priority of Japanese Patent Application No. 2014-016190 filed on Jan. 30, 2014, the entire contents of which are hereby incorporated by reference.

DESCRIPTION OF NOTATIONS

10 mobile station
101 DL signal reception unit
103 UL signal transmission unit
105 quality measurement unit
107 reconnection determination unit
109 reconnection request unit
111 CC management unit
113 identifier management unit
20 base station
201 UL signal reception unit
203 DL signal transmission unit
205 PCell information storage unit
207 reconnection request forward unit
209 CC management unit
211 identifier management unit
213 inter-eNB communication unit
25 base station
251 UL signal reception unit
253 DL signal transmission unit
255 reconnection-target cell designation unit
256 reconnection request processing unit
257 reconnection request forward unit
259 CC management unit
261 identifier management unit
263 inter-eNB communication unit

The invention claimed is:

1. A terminal comprising:
a transceiver that communicates with a first base station that is a base station of a primary cell and a second base station that is a base station of a secondary cell according to dual connectivity; and
a processor that:
when an integrity failure occurs, generates a re-establishment request using information that includes an identifier of the primary cell, an identifier of the terminal in the primary cell, and security information,
wherein the transceiver transmits the re-establishment request to the first base station, if it is determined that the terminal is to be connected to the first base station based on quality measurement.

2. A second base station comprising:
a receiver that receives, from a terminal that communicates with a first base station that is a base station of a primary cell and the second base station that is a base station of a secondary cell according to dual connectivity, a re-establishment request that is triggered by occurrence of an integrity failure; and
a transmitter that forwards the received re-establishment request to the first base station, if it is determined that the terminal is to be connected to the first base station based on quality measurement.

3. The second base station as claimed in claim 2, further comprising:
a memory that stores first information that includes an identifier of the primary cell, an identifier of the terminal in the primary cell, and security information,
wherein the transmitter forwards the received re-establishment request to the first base station when second information included in the received re-establishment request matches the first information.

4. A communication method in a terminal, comprising:

communicating with a first base station that is a base station of a primary cell and a second base station that is a base station of a secondary cell according to dual connectivity;

when an integrity failure occurs, generating a re-establishment request using information that includes an identifier of the primary cell, an identifier of the terminal in the primary cell, and security information; and transmitting the re-establishment request to the first base station, if it is determined that the terminal is to be connected to the first base station based on quality measurement.

5. A first base station that is a base station of a primary cell, comprising:

a transceiver that communicates with a terminal together with a second base station that is a base station of a secondary cell according to dual connectivity;

wherein when an integrity failure occurs, the transceiver receives a re-establishment request from the terminal, if it is determined that the terminal is to be connected to the first base station based on quality measurement, and wherein the re-establishment request is generated using information that includes an identifier of the primary cell, an identifier of the terminal in the primary cell, and security information.

6. A system comprising a first base station that is a base station of a primary cell and a terminal:

the terminal comprising:

a first transceiver that communicates with the first base station and a second base station that is a base station of a secondary cell according to dual connectivity; and a processor that:

when an integrity failure occurs, generates a re-establishment request using information that includes an identifier of the primary cell, an identifier of the terminal in the primary cell, and security information, wherein the first transceiver transmits the re-establishment request to the first base station, if it is determined that the terminal is to be connected to the first base station based on quality measurement; and the first base station comprising:

a second transceiver that receives the re-establishment request from the terminal.

\* \* \* \* \*